(12) United States Patent
Ouellette et al.

(10) Patent No.: US 8,441,141 B1
(45) Date of Patent: May 14, 2013

(54) WIND POWER SYSTEM

(75) Inventors: Richard P. Ouellette, Lakewood, CA (US); Benjamin A. Harber, Costa Mesa, CA (US)

(73) Assignee: The Boeing Company, Chicago, IL (US)

( * ) Notice: Subject to any disclaimer, the term of this patent is extended or adjusted under 35 U.S.C. 154(b) by 401 days.

(21) Appl. No.: 12/721,628

(22) Filed: Mar. 11, 2010

(51) Int. Cl.
*H02P 9/04* (2006.01)

(52) U.S. Cl.
USPC .......................................................... 290/55

(58) Field of Classification Search .................. 290/54, 290/55, 44
See application file for complete search history.

(56) References Cited

U.S. PATENT DOCUMENTS

| | | | |
|---|---|---|---|
| 1,164,967 A | 12/1915 | Thorp | |
| 1,547,912 A | 7/1925 | Hall | |
| 1,731,091 A | 10/1929 | Clayton | |
| 1,869,506 A | 8/1932 | Richardson | |
| 2,542,522 A * | 2/1951 | Hings | 290/55 |
| 3,167,278 A | 1/1965 | Roberge | |
| 3,520,502 A | 7/1970 | Smethers, Jr. | |
| 3,599,907 A | 8/1971 | Ramsom et al. | |
| 4,049,300 A * | 9/1977 | Schneider | 290/54 |
| 4,645,144 A | 2/1987 | Zupanick | |
| 4,890,751 A | 1/1990 | Opdahl | |
| 4,923,148 A | 5/1990 | Fillingham et al. | |
| 5,103,712 A | 4/1992 | Minovitch | |
| 5,685,147 A * | 11/1997 | Brassea | 60/496 |
| 6,072,245 A | 6/2000 | Ockels | |
| 6,874,729 B1 | 4/2005 | McDonnell | |
| 7,097,137 B2 | 8/2006 | McDonnell | |
| 7,152,828 B1 | 12/2006 | Garcia, Jr. | |
| 7,156,036 B2 | 1/2007 | Seiple | |
| 7,598,646 B2 * | 10/2009 | Cleveland | 310/156.43 |
| 7,862,290 B2 * | 1/2011 | Diederich | 415/5 |
| 8,134,251 B2 * | 3/2012 | Barber | 290/55 |
| 2003/0001393 A1 * | 1/2003 | Staikos et al. | 290/55 |
| 2005/0145752 A1 | 7/2005 | Beyerle | |
| 2006/0202088 A1 | 9/2006 | Padan | |
| 2009/0021012 A1 * | 1/2009 | Stull et al. | 290/44 |
| 2010/0025523 A1 | 2/2010 | Kutzmann et al. | |
| 2010/0038477 A1 | 2/2010 | Kutzmann et al. | |

FOREIGN PATENT DOCUMENTS

| | | |
|---|---|---|
| DE | 2930073 | 2/1981 |
| DE | 3139802 | 4/1983 |
| FR | 2340459 | 9/1977 |
| GB | 2017617 | 3/1978 |
| JP | 2006-194198 | 7/2006 |
| WO | 87/04496 | 7/1987 |

OTHER PUBLICATIONS

"Hywind: Siemens and StatoilHydro install first floating wind turbine," by Siemens AG, Germany, 3 pages (Jun. 10, 2009).

(Continued)

*Primary Examiner* — Tulsidas C Patel
*Assistant Examiner* — Viet Nguyen
(74) *Attorney, Agent, or Firm* — Diane M. Tsuda (57) ABSTRACT

A wind power system including a first pulley, a second pulley spaced from the first pulley, a continuous loop structure engaged with the first and second pulleys, a plurality of airfoils fixedly connected to the continuous loop structure, wherein the airfoils extend outward from the continuous loop structure, and a fairing positioned to direct airflow to the airfoils.

22 Claims, 6 Drawing Sheets

OTHER PUBLICATIONS

"Wind power project floating out to North Sea," *Pure Energy Systems News*, 7 pages (Nov. 3, 2005).

"FLIP (Floating Instrument Platform) Research Vessel—Ship Technology," http://www.ship-technology.com/projects/flip-ship/; 3 pages (Feb. 18, 2010).

"CEROS Project Description," CEROS—National Defense Center of Excellence for Research in Ocean Sciences, pp. 1-2 (Jun. 26, 2006) http://www.ceros.org/documents/projectdescriptions/13%20PD_CTA_SoftRail_53798.pdf.

Office Action, U.S. Appl. No. 11/874,804 (May 26, 2010).

Combined Search and Examination Report, United Kingdom Application No. GB0814038.6 (Nov. 27, 2008).

PCT, International Search Report and Written Opinion, International Application No. PCT/US2011/024788 (Dec. 19, 2011).

\* cited by examiner

WIND POWER SYSTEM

FIELD

This application relates to alternative energy and, more particularly, to wind power systems and, even more particularly, to the use of airfoils and a continuous loop structure to rotate pulleys.

BACKGROUND

Wind power systems have been developed to convert wind energy into more useful forms of energy, such as electrical energy. Therefore, as fossil fuel reserves dwindle and political tensions associated with the use of fossil fuels continue to rise, wind power systems become viable sources of alternative energy.

Horizontal axis wind turbines typically include three massive blades connected to a rotor shaft that, by way of a gearbox, drives an electric generator. The blades, rotor shaft, gearbox and generator are mounted at the top of a mast that is sufficiently tall to elevate the components of the system off of the ground and sufficiently massive to support the substantial weight of the components.

Unfortunately, the massive size and complexity of such horizontal axis wind turbines typically results in high start-up capital costs, as well as high ongoing maintenance costs. Therefore, horizontal axis wind turbines are generally considered to have a relatively high cost per kilowatt-hour when compared to other common forms of energy, such as coal, crude oil and natural gas.

Furthermore, the viability of wind power systems typically depends on the ability to position such systems in an area that receives a consistent supply of substantial wind. However, the most desirable locations for wind power systems (e.g., along the coasts and over deep ocean waters) often present more complicated engineering challenges, particularly for massive horizontal axis wind turbines.

Accordingly, those skilled in the art continue to seek alternative sources of energy, including systems that harness wind energy.

SUMMARY

In one aspect, the disclosed wind power system may include a first pulley, a second pulley spaced from the first pulley, a continuous loop structure engaged with the first and second pulleys, and a plurality of airfoils fixedly connected to the continuous loop structure, wherein the airfoils extend outward from the continuous loop structure.

In another aspect, the disclosed wind power system may include a first pulley, a second pulley spaced from the first pulley, a continuous loop structure engaged with the first and second pulleys, and a plurality of airfoils, each airfoil including a leading edge and a root portion, wherein the root portion is connected to the continuous loop structure such that the leading edge extends outward from the continuous loop structure at a non-zero angle relative to the root portion.

In another aspect, the disclosed wind power system may include a plurality of pulleys, a continuous loop structure engaged with each of the pulleys, a plurality of airfoils, each airfoil including a leading edge and a root portion, wherein the root portion is connected to the continuous loop structure such that the leading edge extends outward from the continuous loop structure at a non-zero angle relative to the root portion, and a fairing positioned to direct airflow to the leading edges of the airfoils.

In yet another aspect, disclosed is a method for generating electrical energy. The disclosed method may include the steps of (1) providing a wind power system that includes a first pulley, a second pulley spaced from the first pulley, a continuous loop structure engaged with the first and second pulleys, and a plurality of airfoils connected to the continuous loop structure, wherein each airfoil radiates outward from the continuous loop structure, (2) positioning the wind power system in an airflow such that the airfoils generate lift in response to the airflow, wherein the lift effects movement of the continuous loop structure relative to the first and second pulleys and corresponding rotation of the first and second pulleys, and (3) converting the rotation of at least one of the first and second pulleys into electrical energy.

Other aspects of the disclosed wind power system will become apparent from the following description, the accompanying drawings and the appended claims.

DETAILED DESCRIPTION

Figure 1:
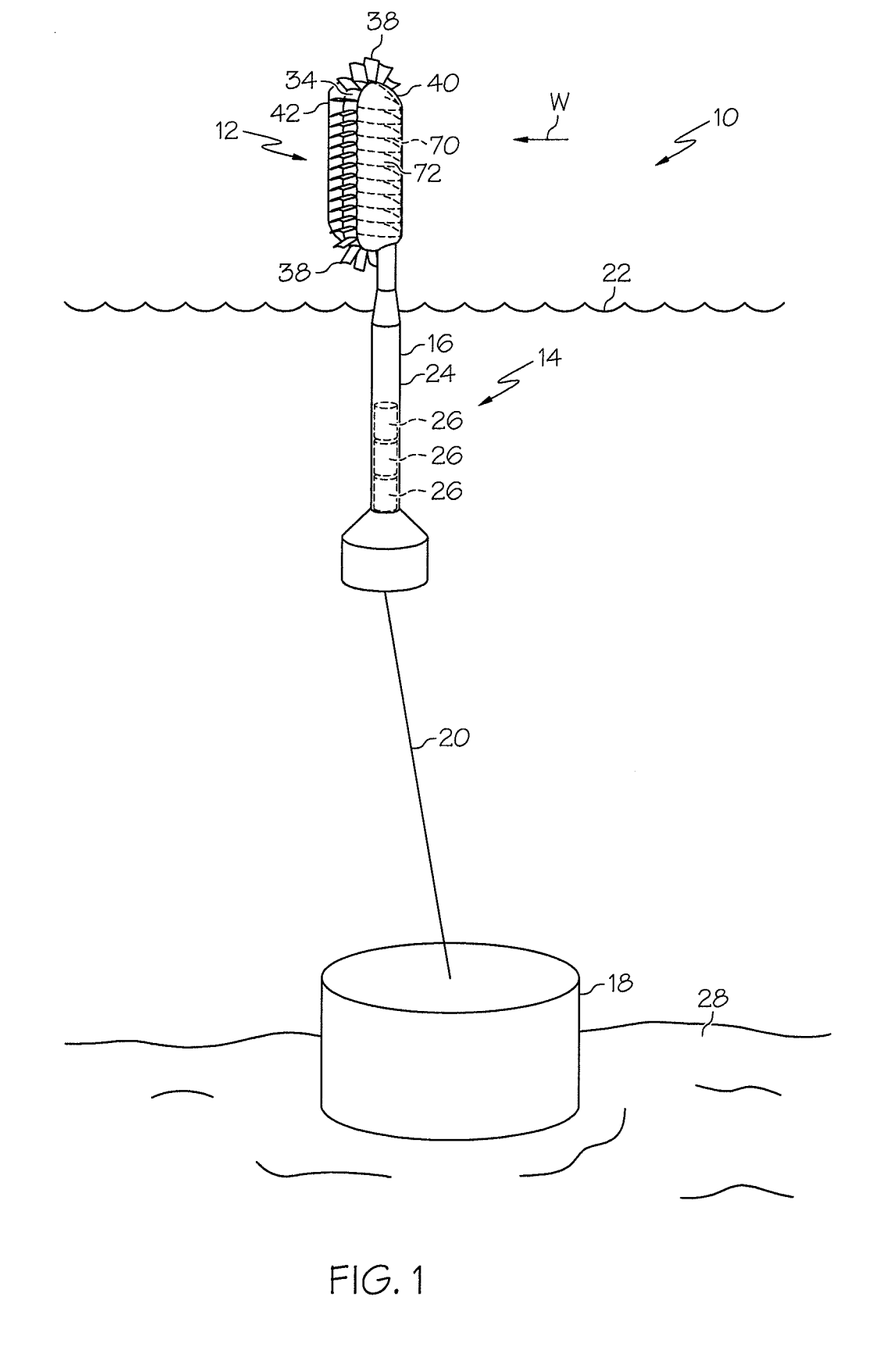
FIG. 1 is a front perspective view of a first aspect of the disclosed wind power system, wherein the wind power system includes a wind power assembly and a support structure.

Referring to FIG. 1, a first aspect of the disclosed wind power system, generally designated 10, may include a wind power assembly 12 and a support structure 14 for supporting the wind power assembly 12. The wind power system 10 may be positioned in an outdoor environment such that wind (arrow W) may act on the wind power assembly 12 to convert the energy of the wind into another form of useful energy, such as mechanical motion, electrical energy or the like.

In a first implementation of the first aspect, the support structure 14 may be a floating support structure and may include a buoy 16, an anchor structure 18 and a tether 20. The wind power assembly 12 may be connected to the buoy 16. The tether 20 may connect the buoy 16 to the anchor structure 18.

The buoy 16 may be any structure with sufficient buoyancy to support the wind power assembly 12 above water level 22. In a first expression of the first implementation, the buoy 16 may include an air-tight housing 24 filled with a buoyant material, such as air, polystyrene foam or the like. In a second expression of the first implementation, the outer housing 24 may be filled with a plurality of separate air-tight vessels 26 (e.g., tanks or barrels) that have been filled with a buoyant material, such as air, polystyrene foam or the like, thereby mitigating rupture issues and reducing the structural requirements of the outer housing 24.

The anchor structure 18 may be any structure capable of resisting pulling forces from the buoy 16 tethered thereto, thereby maintaining the buoy 16 at a desired location in a body of water. As a first example, the anchor structure 18 may be a body having sufficient mass, such as a concrete block or a tank filled with seawater, that has been deposited on the seafloor 28. As a second example, the anchor structure 18 may be the earth, such as the seafloor 28 or bedrock below the seafloor 28, wherein as fastener, hooking device or the like (not shown) may be used to connected the tether 20 to the earth.

Figure 2:
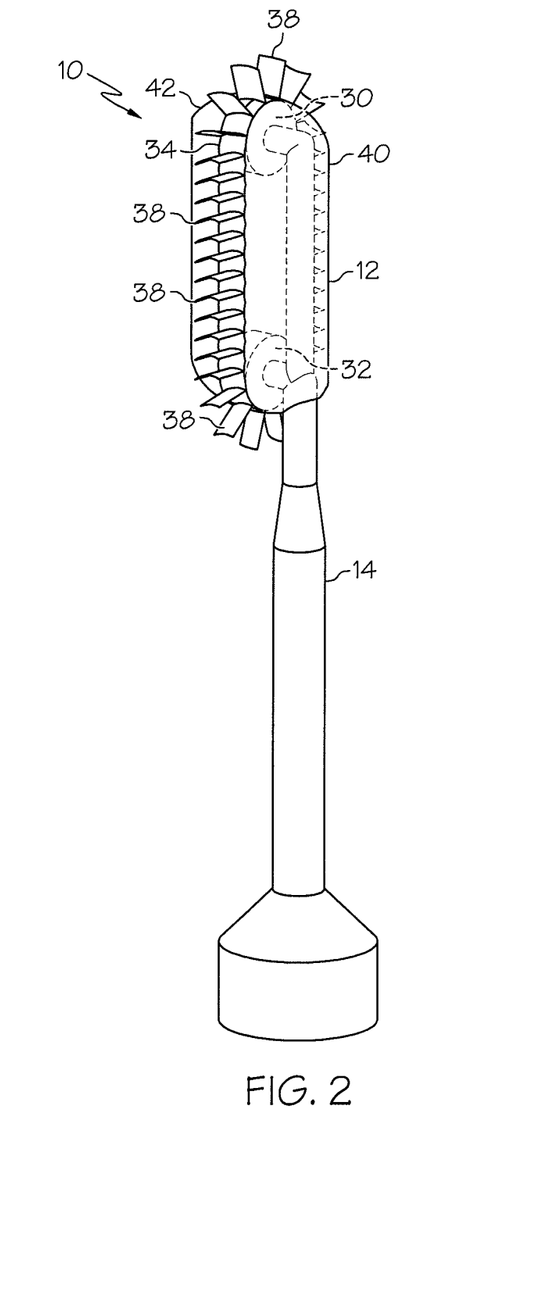
FIG. 2 is a front perspective view of a portion of the wind power system of FIG. 1.
Figure 3:
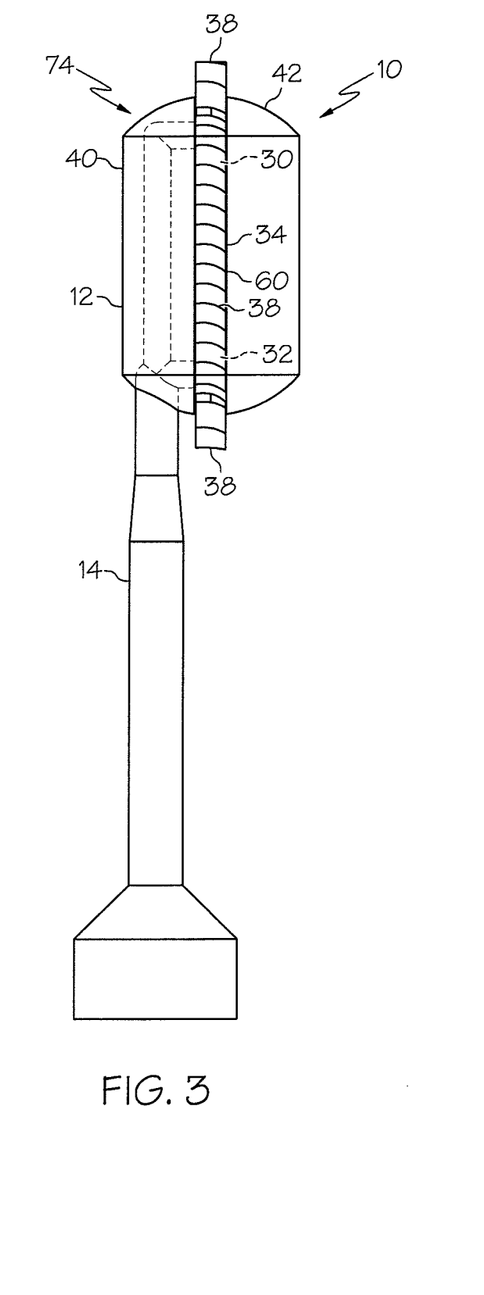
FIG. 3 is a side elevational view of the wind power system of FIG. 2.
Figure 4:
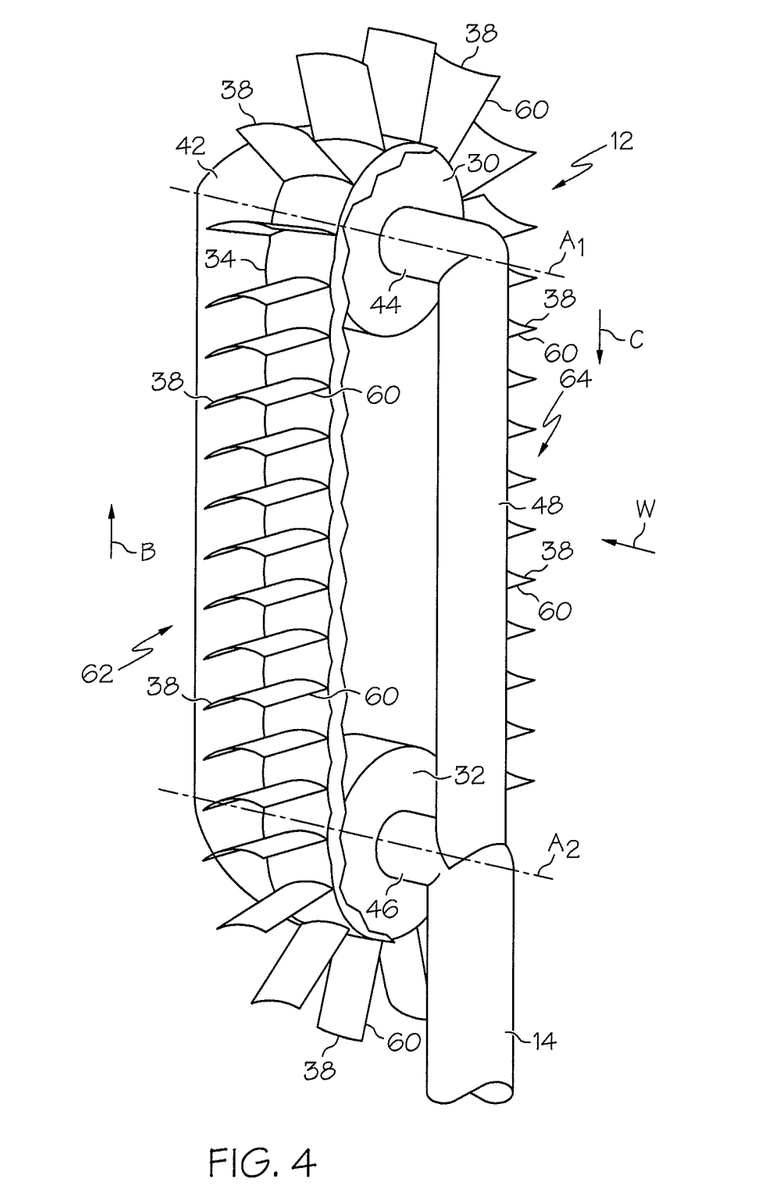
FIG. 4 is a front perspective view of the wind power assembly of the wind power system of FIG. 1 showing internal system elements.

Referring to FIGS. 2-4, the wind power assembly 12 may include a first, upper pulley 30, a second, lower pulley 32, a continuous loop structure 34, a plurality of airfoils 38 and an fairing 40. A trailing fin 42 may also be included to enhance aerodynamics and/or to form an enclosure within the wind power assembly 12.

As shown in FIG. 4, the first pulley 30 may be rotatably mounted on a first axle 44 for rotation about a first axis $A_1$ of rotation. The second pulley 32 may be rotatably mounted on a second axle 46 for rotation about a second axis $A_2$ of rotation. The first axle 44 may be spaced apart from the second axle 46 by a spacer 48 such that the first axis $A_1$ of rotation is generally parallel with the second axis $A_2$ of rotation. Optionally, a biasing element (not shown), such as a spring, may be disposed between the first and second axles 44, 46 to bias the first pulley 30 away from the second pulley 32, thereby tensioning the continuous loop structure 34 onto the first and second pulleys 30, 32. Alternatively, an idler arm/spool (not shown) may be located anywhere between the two pulleys 30, 32 and may be pushed outward (e.g., bowing the continuous loop structure 34 outward) to tension the continuous loop structure 34, or may be retracted to slack the system. The idler arm/spool may be used for maintenance when slack was required to remove continuous loop structure 34.

As an example, the first and second pulleys 30, 32 may be drum pulleys. However, those skilled in the art will appreciate that any pulley or spindle-like structure may be used. Furthermore, those skilled in the art will appreciate that the engagement surface of the pulleys 30, 32 (e.g., the outer circumference) may be smooth or may include various features, such as a circumferential groove, gear teeth, friction texturing or the like.

While the wind power assembly 12 is shown in the drawings as having only two pulleys 30, 32, those skilled in the art will appreciate that additional pulleys may be engaged with the continuous loop structure 34 without departing from the scope of the present disclosure. The additional pulleys may be collinear with the first and second pulleys 30, 32, thereby maintaining the obround path of the continuous loop structure 34, or may be displaced in various ways from the line defined by the first and second pulleys 30, 32. For example, when the wind power assembly 12 includes three pulleys, wherein one of the pulleys is not collinear with the other pulleys, the continuous loop structure 34 may follow a generally triangular path.

The continuous loop structure 34 may be received over, and may be engaged with, the first and second pulleys 30, 32. Therefore, the continuous loop structure 34 may rotate over the first and second pulleys 30, 32 in a continuous path to transfer rotational power to the pulleys 30, 32.

The continuous loop structure 34 may be any structure capable of supporting the airfoils 38 and transferring rotational power to the first and second pulleys 30, 32. For example, the continuous loop structure 34 may include a cable, a chain, a rope, a belt or a combination thereof.

Figure 5:
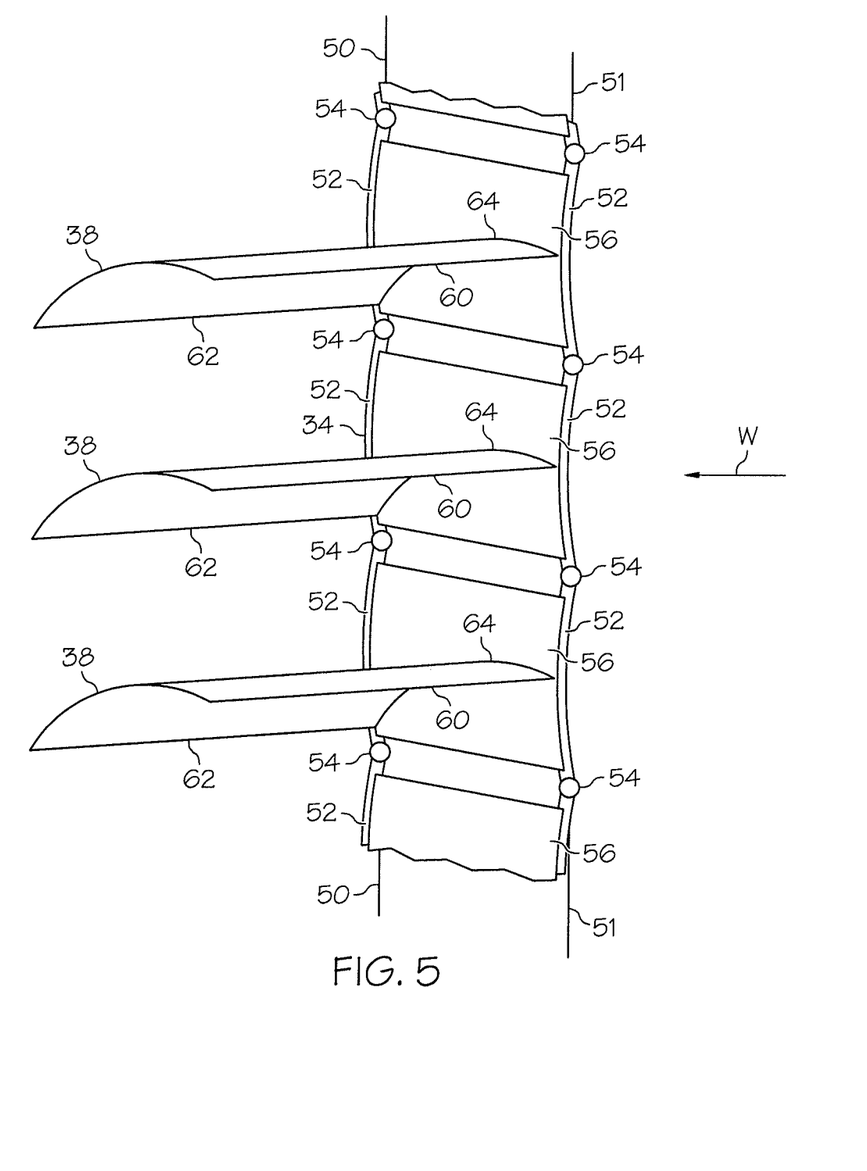
FIG. 5 is a front perspective view of a portion of the wind power assembly of FIG. 4.

As shown in FIG. 5, in one particular implementation, the continuous loop structure 34 may include two cables 50, 51, a plurality of tubes 52, a plurality of interface spheres 54 and a plurality of plates 56. Each cable 50, 51 may include a plurality of tubes 52 received over the cable 50, 51, with adjacent tubes 52 being spaced apart from each other with the interface spheres 54. The ends of each cable 50, 51 may be connected to define a continuous loop. Each plate 56 may be connected to an associated tube 52 on each cable 50, 51, thereby defining the continuous loop structure 34. The airfoils 38 may be connected to the plates 56 of the continuous loop structure 34.

In another implementation, the continuous loop structure 34 may not include plates 56, and the airfoils 38 may be directly connected to the cables 50, 51 or the tubes 52 received over the cables. For example, the root portion 64 adjacent the trailing edge 62 may be connected to the first cable 50 and the root portion 64 adjacent the leading edge 60 may be connected to the second cable 51.

In yet another implementation, the airfoils 38 may be connected to the continuous loop structure 34 by way of lines (not shown), such as nylon lines. For example, the lines may extend from the continuous loop structure 34 to the tips (i.e., the portions of the airfoils opposite the root portions 64) of the airfoils 38. Those skilled in the art will appreciate that the lines may inhibit or prevent the airfoils from flapping.

At this point, those skilled in the art will appreciate that all or a portion of the continuous loop structure 34 may be formed from lightweight composite materials, such as fiber-reinforced resin composite materials.

While the wind power assembly 12 is shown in the drawings as having one continuous loop structure 34, those skilled in the art will appreciate that two or more continuous loop structures 34 may be used without departing from the scope of the present disclosure.

Referring to FIG. 5, the airfoils 38 may be any structures capable of generating lift in response to wind (arrow W) acting on a leading edge 60 thereof. The number of airfoils 38 may be deemed an optimizable design consideration that may depend on the length of the continuous loop structure 34 and the size of the airfoils 38, among other factors. Those skilled in the art will appreciate that too few airfoils may not generate enough lift, but that too many airfoils 38 may result in drag or interference between the airfoils 38.

Each airfoil 38 may include a leading edge 60, a trailing edge 62 and a root portion 64. The root portion 64 of each airfoil 38 may be connected to the continuous loop structure 34 such that the leading edge 60 of each airfoil 38 extends outward from the continuous loop structure 34 at a non-zero angle relative to the root portion 64 in a radial direction relative to at least one of first and second pulley 30, 32. For example, the leading edge 60 of each airfoil 38 may be generally perpendicular to the root portion 64 (i.e., the non-zero angle may be about 90 degrees).

In one particular implementation, the root portion 64 of each airfoil 38 may be fixedly and rigidly connected to the continuous loop structure 34. In an alternative implementation, the root portion 64 of each airfoil 38 may be connected to the continuous loop structure 34 in a manner that provides some pivoting of the airfoil 38 relative to the continuous loop structure 34.

In a first expression, not shown, the airfoils 38 may be formed as a hollow body that includes an upper camber and a lower camber. In a second expression, as shown in FIG. 5, the airfoils 38 may be single camber airfoils and may not define an internal volume. In a first example, the single camber airfoils 38 may be formed by shaping a sheet of formable, lightweight material, such as aluminum. In a second example, the single camber airfoils 38 may be cast using a lightweight polymeric material. In a third example, the single camber airfoils 38 may be fabric airfoils that have been stiffened with composite ribs.

As shown in FIG. 4, the airfoils 38 may be connected to the continuous loop structure 34 such that the airfoils 38 on a first side 62 of the wind power assembly 12 generate upward lift (arrow B), while the airfoils 38 of the second, opposite side 64 generate downward lift (arrow C), thereby providing the wind power assembly 12 with continuous positive lift and, as such, continuous positive torque. In other words, wind acting on the first side 62 of the wind power assembly 12 does not cancel out the lift generated by the wind acting the second, opposite side 64 of the wind power assembly 12.

Referring to FIGS. 1-3, the fairing 40 may be any aerodynamic structure connected to the wind power assembly 12 that directs wind (arrow W) to the leading edges 60 (FIG. 5) of the airfoils 38. Additionally, the fairing 40 may cover the internal components, such as the pulleys 30, 32, of the wind power assembly 12.

As an example, as shown in FIG. 1, the fairing 40 may include a plurality of ribs 70 and a cover 72. The ribs 70 may be formed from lightweight material, such as a fiber-reinforced composite, and may be assembled into an aerodynamic three-dimensional structure. The cover 72 may be a sheet of lightweight material, such as fabric (e.g., nylon), and may be stretched over, and secured to, the ribs 70.

In one optional implementation, the fairing 40 and the trailing fin 42 may define a vane 74, as shown in FIG. 3. The vane 74 may advantageously orient the wind power system 10 in the wind (arrow W) such that the wind acts on, and is perpendicular to, the leading edges 60 (FIG. 5) of the airfoils 38.

In a second aspect, the disclosed wind power system may include an electrical energy generator.

Figure 6:
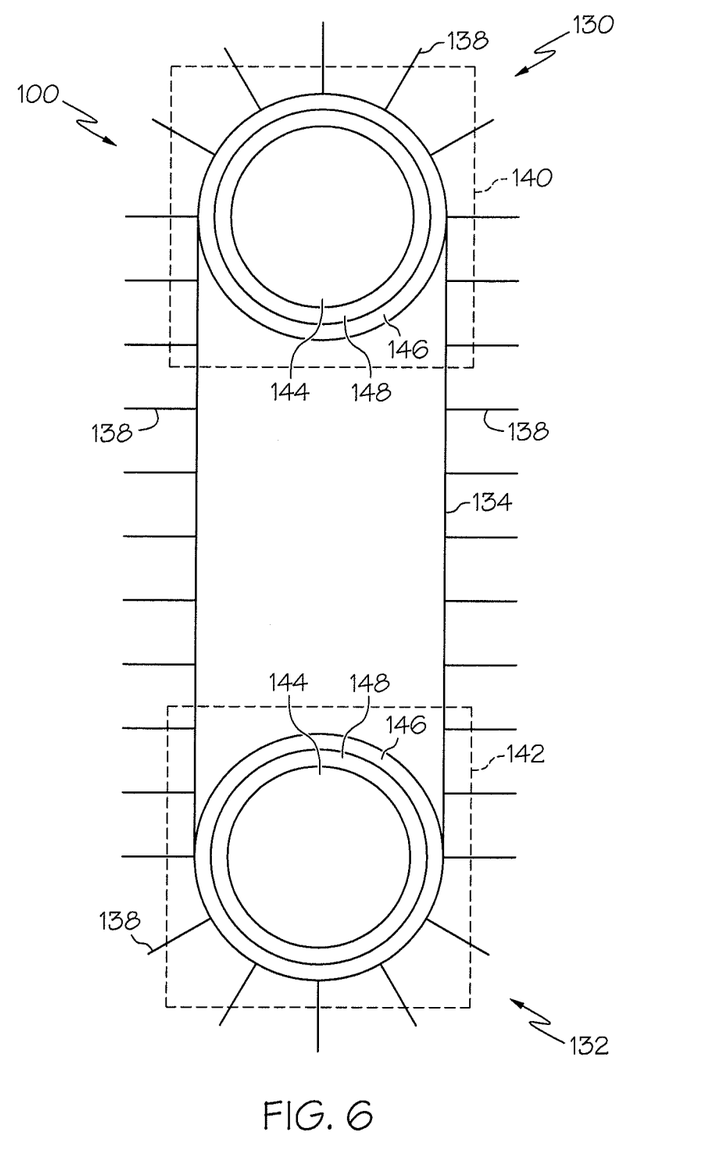
FIG. 6 is a schematic side elevational view of a portion of the wind power assembly of a second aspect of the disclosed wind power system.

Referring to FIG. 6, in one particular implementation of the second aspect, the wind power system may include a wind power assembly, generally designated 100, which may be similar to the wind power assembly 12 shown in FIG. 4 in that it may include first and second pulleys 130, 132, a continuous loop structure 134 and a plurality of airfoils 138. Additionally, the wind power assembly 100 may include large air gap electric ring generators 140, 142 associated with the first and second pulleys 130, 132, respectively. While only one large air gap electric ring generator may be used, two or more generators provides redundancy in the event of a failure. Furthermore, due to weight of the large air gap electric ring generators 140, 142, only one generator 142 may be used and may be positioned as close to the surface 22 as possible. Large air gap electric ring generators 140, 142 are expandable in a linear fashion and, therefore, if more power is required, additional arrays can be implemented on the lower pulley 132. Instead of one array located on one outer spindle, many arrays can span the entire length of the axle to produce/capture more power.

The large air gap electric ring generators 140, 142 may be of the type described in U.S. Pat. No. 7,598,646 to Cleveland, the entire contents of which are incorporated herein by reference. Cleveland discloses an electric motor that includes a first plurality of magnets, a first plurality of electromagnets, and a controller. The first plurality of magnets is arranged in a first Halbach array and is configured to provide a first magnetic field that substantially exhibits a first Halbach flux distribution. The first plurality of electromagnets includes a first plurality of coils arranged in a second Halbach array. The controller is adapted to selectively direct current through the first plurality of coils to induce a second magnetic field to interact with the first magnetic field, wherein the second magnetic field substantially exhibits a second Halbach flux distribution.

Thus, each generator 140, 142 may include an array 144 of permanent magnets coupled for rotation with the associated pulley 130, 132 and an array 146 of electromagnets that is fixed relative to the array 144 of permanent magnets. An air gap 148 may separate the array 146 of electromagnets from the array 144 of permanent magnets.

At this point, those skilled in the art will appreciate that the use of large air gap electric ring generators 140, 142 may be advantageous due to the lack of wear and the ability to fully seal the arrays 144, 146 from the environment, thereby minimizing maintenance costs. Furthermore, generators 140, 142 weigh significantly less than conventional generators because, among other things, they do not require a gear box.

Figure 7:
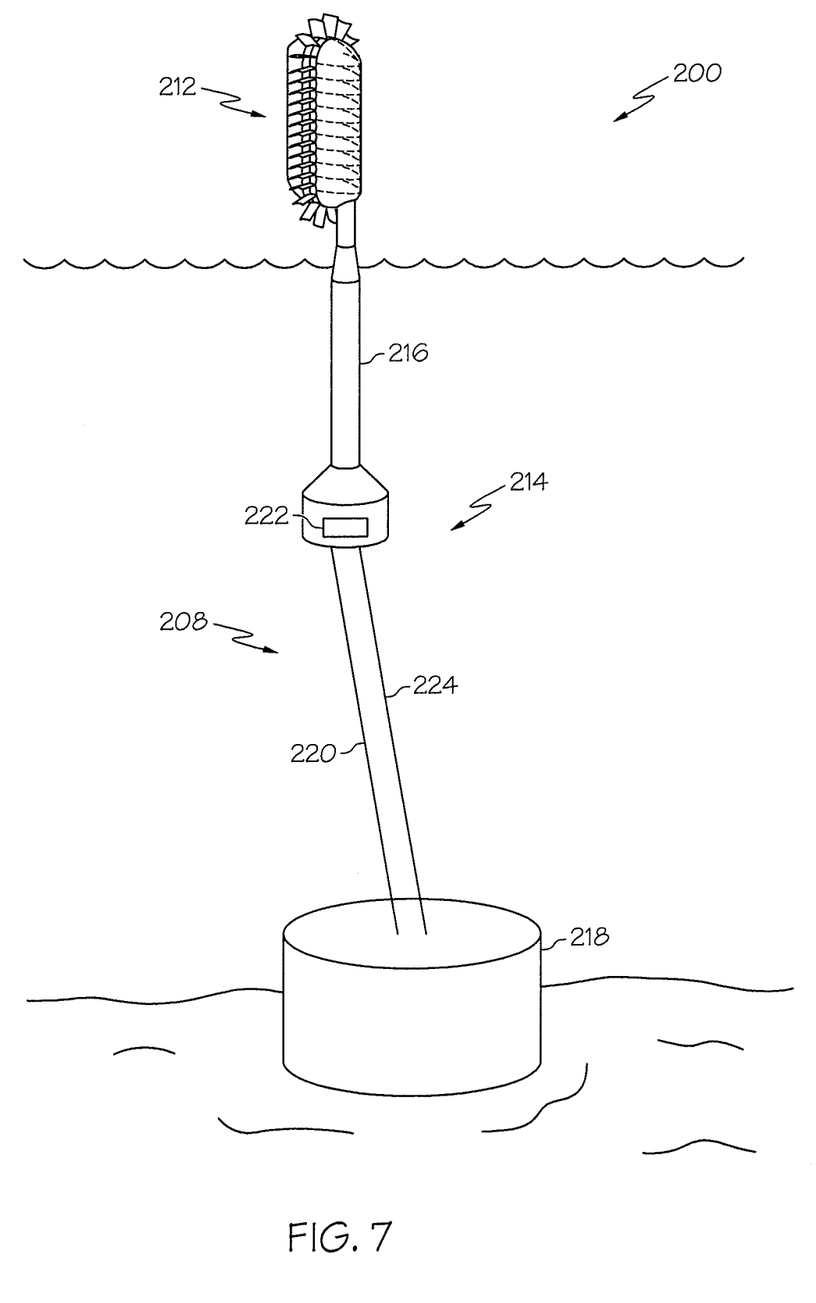
FIG. 7 is a front perspective view of a third aspect of the disclosed wind power system.

Referring to FIG. 7, a third aspect of the disclosed wind power system, generally designated 200, may include a wind power assembly 212, a support structure 214 for supporting the wind power assembly 212, and a pneumatic energy storage system 208. The support structure 214 may include a buoy 216, a submerged vessel 218 and a tether 220 that connects the buoy 216 to the vessel 218. The pneumatic energy storage system 208 may include an electro air compressor/expansion engine 222 and an air line 224, wherein the air line 224 pneumatically couples the air compressor/expansion engine 222 with the submerged vessel 218. Optionally, the air line 224 and the tether 220 may be one and the same.

The submerged vessel 218 may be an air tank or the like. Electrical power generated by the wind power assembly 212 may be used to run the air compressor/expansion engine 222 to fill the submerged vessel 218 with air (via air line 224) by displacing seawater. Then, when additional electrical power is desired, the air pressure in the vessel 218 may be used to drive the air compressor/expansion engine 222 in reverse to generate electrical power. For example, air compressor/expansion engine 222 may fill the vessel 218 with air during off-peak hours and the air compressor/expansion engine 222 may be powered by the compressed air during peak hours.

Accordingly, the disclosed wind power systems provide a useful means for harnessing wind energy. Specifically, the disclosed wind power systems may be used to generate electrical energy by positioning the disclosed wind power system in an airflow to effect rotation of the pulleys and converting the rotation of at least one of the pulleys into electrical energy.

Although various aspects of the disclosed wind power system have been shown and described, modifications may occur to those skilled in the art upon reading the specification. The present application includes such modifications and is limited only by the scope of the claims.

What is claimed is:
1. A wind power system comprising:
a first pulley;
a second pulley spaced from said first pulley;
a continuous loop structure mounted on and extending about said first and said second pulleys;
a plurality of airfoils connected to said continuous loop structure, each airfoil of said plurality of airfoils having a leading edge, a trailing edge and a root portion, said root portion being attached to said continuous loop structure, and each airfoil of said plurality of airfoils being oriented such that said leading edge extends outwardly from said continuous loop structure in a radial direction relative to at least one of said first pulley and said second pulley; and a fairing positioned over said first pulley and said second pulley to direct airflow sidewardly in a radial direction to said plurality of airfoils.

2. The wind power system of claim 1 wherein said continuous loop structure includes a first cable connected to each of said airfoils of said plurality adjacent to a leading edge of said airfoils.

3. The wind power system of claim 2 wherein said continuous loop structure includes a second cable connected to each of said airfoils of said plurality adjacent to a trailing edge of said airfoils.

4. The wind power system of claim 3 wherein said continuous loop structure includes a plurality of tubes received over each of said first and second cables.

5. The wind power system of claim 4 wherein said continuous loop structure includes a plurality of plates, and wherein each plate of said plurality is connected to at least one of said tubes received over said first cable and at least one of said tubes received over said second cable.

6. The wind power system of claim 4 wherein said continuous loop structure includes a plurality of interface spheres, and wherein each tube of said plurality that is received over said first cable is separated from adjacent ones of said tubes by at least one of said interface spheres of said plurality.

7. The wind power system of claim 6 wherein each tube of said plurality that is received over said second cable is separated from adjacent ones of said tubes by at least one of said interface spheres of said plurality.

8. The wind power system of claim 1 wherein each airfoil of said plurality of airfoils is connected to said continuous loop structure by at least one line.

9. The wind power system of claim 1 wherein each airfoil of said plurality includes at least one camber extending from said leading edge to said trailing edge.

10. The wind power system of claim 1 wherein said airfoils of said plurality are fixedly connected to said continuous loop structure.

11. The wind power system of claim 1 wherein said leading edge extends outward from said continuous loop structure at a non-zero angle relative to said root portion.

12. The wind power system of claim 11 wherein said non-zero angle is about 90 degrees.

13. The wind power system of claim 1 further comprising a support structure connected to said first pulley.

14. The wind power system of claim 13 wherein said support structure includes a buoy.

15. The wind power system of claim 1 further comprising an electric generator coupled to at least one of said first and said second pulleys.

16. The wind power system of claim 15 wherein said electric generator includes an array of electromagnets spaced from an array of permanent magnets by an air gap.

17. The wind power system of claim 1 further comprising an air compressor/expansion engine pneumatically coupled to an air tank.

18. The wind power system of claim 17 further comprising a generator in fluid communication with said air tank.

19. A wind power system comprising:
a first pulley;
a second pulley spaced from said first pulley;
a continuous loop structure extending about said first and said second pulleys; and
a plurality of airfoils, each airfoil of said plurality of airfoils including a leading edge, a trailing edge, a camber extending from said leading edge to said trailing edge, and a root portion, said root portion being connected to said continuous loop structure, and each airfoil of said plurality of airfoils being oriented such that said leading edge extends outward from said continuous loop structure at a non-zero angle relative to said root portion in a radial direction relative to at least one of said first pulley and said second pulley.

20. A wind power system comprising:
a plurality of pulleys;
a continuous loop structure mounted on and extending about each pulley of said plurality;
a plurality of airfoils, each airfoil of said plurality of airfoils including a leading edge, a trailing edge, a camber extending from said leading edge to said trailing edge, and a root portion, said root portion being connected to said continuous loop structure, and each airfoil of said plurality of airfoils being oriented such that said leading edge extends outward from said continuous loop structure at a non-zero angle relative to said continuous loop structure in a radial direction relative to at least one pulley of said plurality of pulleys; and
a fairing positioned over said plurality of pulleys and shaped to direct airflow radially outwardly from each of said plurality of pulleys to said leading edges of said plurality of airfoils.

21. A method for generating electrical energy comprising the steps of:
providing a wind power system that includes a first pulley, a second pulley spaced from said first pulley, a continuous loop structure mounted on and extending about said first and said second pulleys, and a plurality of airfoils connected to said continuous loop structure, each airfoil of said plurality of airfoils including a leading edge, a trailing edge, a camber extending from said leading edge to said trailing edge, and being attached to said continuous loop structure, and each airfoil of said plurality of airfoils being oriented such that said leading edge extends outward from said continuous loop structure in a radial direction relative to at least one of said first pulley and said second pulley;
positioning said wind power system in an airflow such that said airflow flows across said plurality of airfoils from said leading edges to said trailing edges thereof in a direction parallel to axes of rotation of said first pulley and said second pulley, said plurality of airfoils generating lift in response to said airflow, wherein said lift effects movement of said continuous loop structure relative to said first and said second pulleys and corresponding rotation of said first and said second pulleys; and
converting said rotation of at least one of said first and said second pulleys into said electrical energy.

22. The method of claim 21 wherein said converting step includes rotating an array of permanent magnets relative to an array of electromagnets.

* * * * *